May 12, 1953  V. O. HARTZ  2,638,054
VARIABLE FLUID DRIVE MECHANISM
Filed Dec. 27, 1947  2 Sheets-Sheet 2
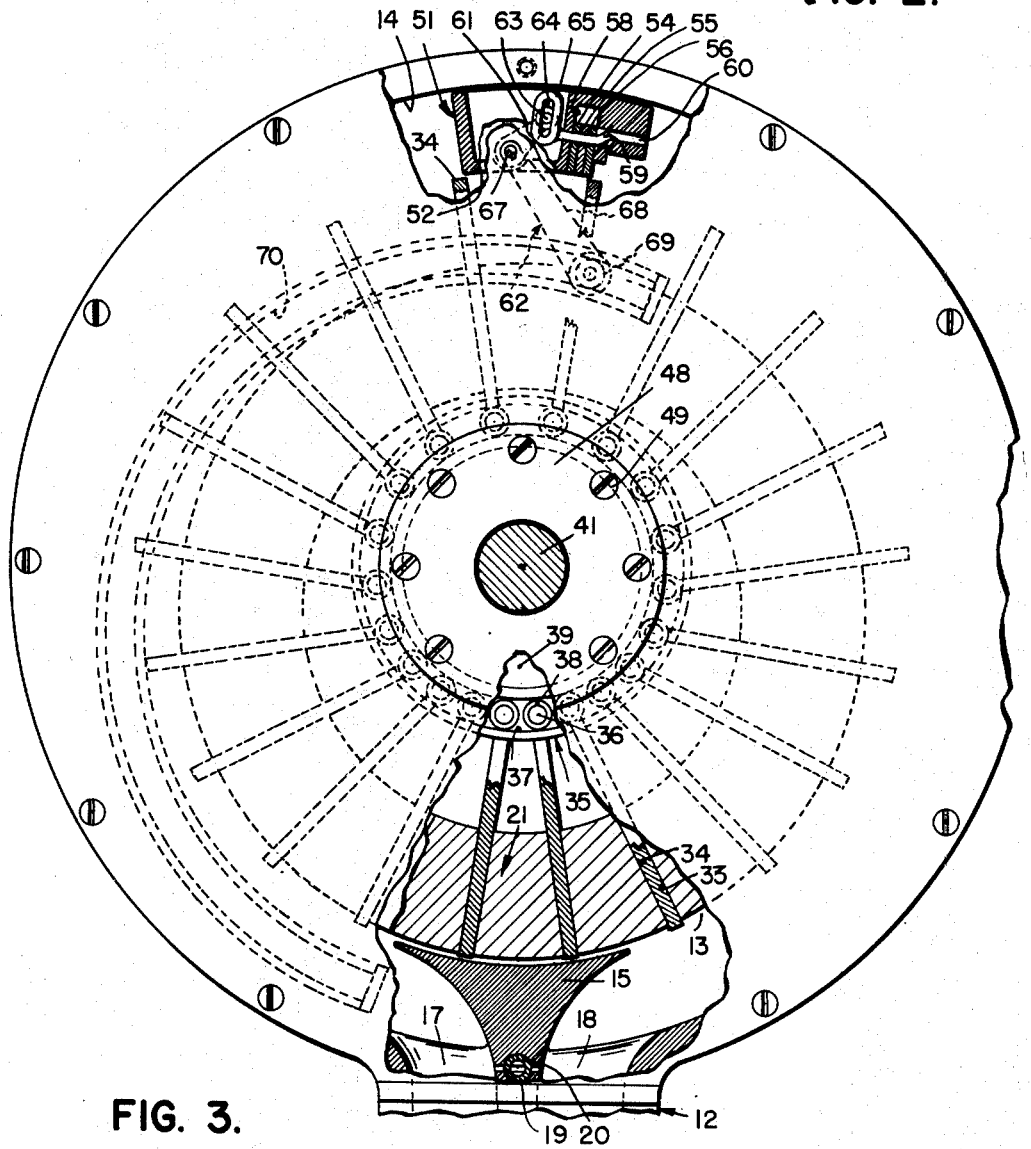
FIG. 2.
FIG. 3.
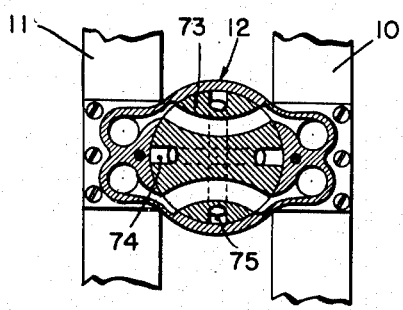
INVENTOR
VERNON O. HARTZ
BY
Mason & Graham
ATTORNEYS Patented May 12, 1953

2,638,054

UNITED STATES PATENT OFFICE 2,638,054

VARIABLE FLUID DRIVE MECHANISM

Vernon O. Hartz, Glendale, Calif.

Application December 27, 1947, Serial No. 794,169

8 Claims. (Cl. 103—120)

The present invention relates to a hydraulic power transmission system, and more particularly to a system for transmitting torques, with varying degrees of mechanical advantage, from one rotatable shaft to another.

The broad idea of transmitting power by means of hydraulic transmission mechanisms using driving and driven rotary hydraulic pump type mechanisms is not new. However, most of such mechanisms are not adapted for easy control of driving and driven power ratios without undue loss of power.

An object of the present invention is to make a new and improved hydraulic power transmission mechanism.

Another object is to make a hydraulic power transmission system having driving and driven rotary members with a segmental control member mounted to travel circumferentially of a rotary power member.

Another object is to control the power ratio between driving and driven rotary elements by circumferential movement of an abutment control member.

Another object is to make a hydraulic power transmission system having driving and driven rotors and having a circumferentially mounted control member with increments thereof movable to adjust the operative length of the control member to conform to different spacings of cooperating rotor elements.

Another object is to make a power transmitting vane type rotor with the vanes mounted to ride in vane slots in a rotor element, the bases of the vanes being supported for circumferential accommodation while being held against radial movement.

Another object is to control the relative speeds between driving and driven rotors of rotary hydraulic power transmission mechanisms by relative movement of a cooperating segment mounted for circumferential adjustment peripherally adjacent each rotor.

Another object is to make a hydraulic power transmission system, with facilities for varying the relative driving and driven ratios thereof, and for reversing the relative direction of rotation between driving and driven elements of said transmission.

In order to attain these objects, there is provided in accordance with one feature of the invention, a pair of hydraulic vane type rotors, each mounted in a rotor casing and having an annular chamber of uniform cross section, located circumferentially of, and radially beyond, the path of the outer ends of the blades during a rotation of the rotor, with a circumferentially adjustable control member mounted to travel in the annular chamber, the control member having sealing relation with the walls of said chamber, and with the outer ends of two adjacent rotor blades simultaneously, the length of the circumferentially adjustable control member being variable to conform to differences in spacing between outer ends of the rotor blades at different zones of their cycle of rotation.

An embodiment of the invention is illustrated in the accompanying drawings, comprising two sheets, and is described in detail in the following description. In the drawings:

Fig. 2 is a sectional view taken on the line 2—2 of Fig. 1, with portions broken away to show the interior construction; and Fig. 3 is a sectional view, in reduced scale, through a control valve taken on the line 3—3 of Fig. 1.

Figure 1:
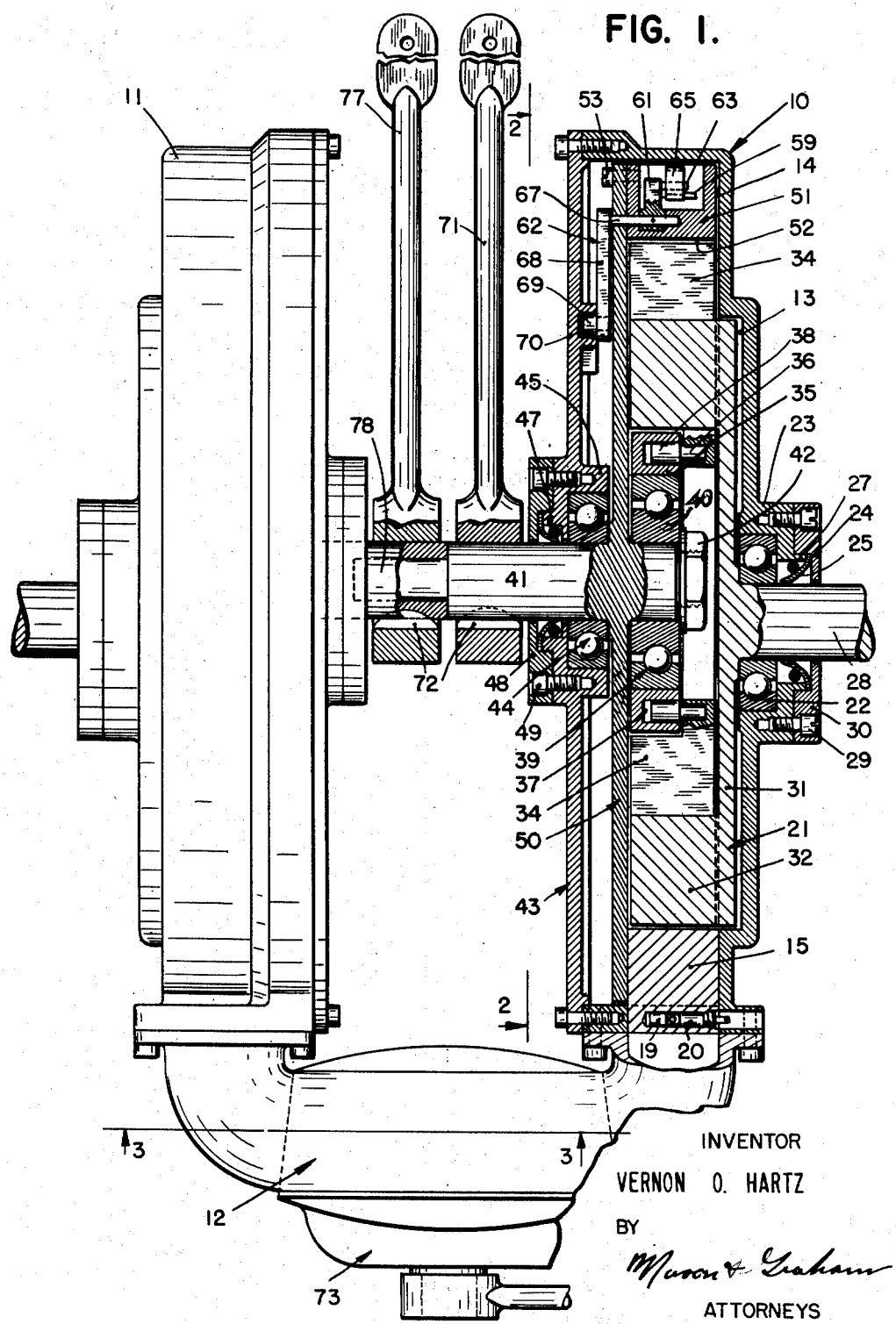
Fig. 1 is a view, partly in side elevation and partly in median section, of a hydraulic power transmission system embodying the present invention.

In the illustrated embodiment of the invention, a pair of pump casings 10 and 11 are mounted on a valve chamber 12. The rotor casings, as illustrated, are of the same diameter as each other, and are mounted to have their shafts coaxial. However, it will be clear to one familiar with the art that the relative sizes and positioning of these members are not essential to the invention.

Since the parts of the driving and driven members are similar to each other, a detailed description of only one of the mechanisms will be given. It may be assumed, for the purpose of the present description, that the casing 10 comprises the power input side, and the casing 11 the power take-off side of the transmission.

Each of the pump casings has an eccentrically mounted rotor 21 which is partially received in a recess 13 formed in the casing wall eccentrically of the casing. The rotor cooperates with the casing to define an annular control chamber which extends circumferentially around the rotor.

A partition or partition block 15 is provided across the lower end of the channel 14 between a pair of ports 17 and 18, here shown as at the lower end of the pump casing. A normally closed bypass valve 19 of a usual type is mounted in a bypass passage 20 interconnecting the two ports, the bypass valve being adapted to open on a predetermined difference of pressures between the ports during operation of the mechanism.

The rotor 21 is rotatably mounted, eccentrically of the casing 10, on a ball bearing 22 mounted in a recessed boss 23 on the casing. The axis of the rotor is offset downwardly from the center of the casing a distance sufficient to bring the lower peripheral edge of the rotor closely adjacent the curved inner surface of the partition 15, so that the rotor with its blades at their innermost limit of retraction will seal the space between the rotor and the abutment 15 during operation of the mechanism.

A fluid seal 24, here illustrated as of the flexible washer 26 and coil spring 27 type, seals against the escape of hydraulic fluid around a rotor shaft 28. A seal retaining plate 30 is secured to the rotor housing by screws 29.

The rotor 21 has a flat disk portion 31, with an axially projecting thick annular rim portion 32. The rim portion is provided with a plurality of transverse radial blade slots 33. A blade 34 is mounted to have a close slidable fit in each of the blade slots, the inner end of each of the blades being notched out to fit inwardly over a side of an annular blade retainer 35. An axially projecting pin 36 having a sleeve 38 thereon is provided at the inner end of each rotor blade.

The blade retainer has an axially facing annular groove 37 therein in which to receive the blade pins 36 and sleeves 38. The annular blade retainer 35 is mounted around the outer race of a ball bearing 39. The inner race 40 of the bearing 39 is mounted on a blade support and control shaft 41, and is secured in position thereon by a retainer nut 42. The control shaft 41 is rotatably mounted on a closure plate 43 forming a side of the rotor casing 10 by a ball bearing 44, which in turn is mounted in a recess in a central boss 45 on the closure plate 43.

An oil seal 47 is secured in place around the control shaft by a cap 48 which is fastened to the closure plate by screws 49. A control supporting disk 50 is mounted to rotate with the control shaft 41, and is here illustrated as being made integrally therewith. The disk 50 is of a size to fit closely within the casing 10 and to fit closely adjacent the rotor blades 34 and slotted rotor rim 32.

A control block member 51, having a curved inner face 52, adapted to conform to the path of the outer ends of the blades 34, is secured to the disk 50, as by screws 53. This control block is adapted to ride in, and seal off, the annular chamber 14 beyond the ends of the blades.

It will be apparent from Fig. 2 that with the control block on the opposite side of the casing from the stationary partition block 15, the spacing between the outer ends of the blades at the control abutment will be greater than when the control block is moved circumferentially in the annular channel 14 to a position closely adjacent the stationary element 15. Since it is preferable to have the control block of a length to just span the outer ends of each pair of blades as they pass the control block, means are provided to change the effective length of the control block in its travel from the position illustrated in Fig. 2 to a position closely adjacent the stationary partition.

This means for controlling the length of the control block 51 comprises three plates 54, 55 and 56, slidably mounted in a notch 58 opening radially inwardly and extending entirely across the block. Each of these plates has a slotted opening therein in which an actuating bar or cam means 59 is inserted for slidable movement therein. The actuating bar has an outwardly offset end portion 60, so that as it is moved from its right hand limit of movement illustrated in Fig. 2 toward the left it will successively move each of the three plates 54, 55 and 56 radially outwardly away from the path of the rotor blade ends, and thereby reduces the effective length of the control block. When in their radially innermost position, as illustrated in Fig. 2, all three of these plates have their inner ends conforming to the curvature defined by the path of movement of the outer ends of the blades.

In order to move the actuating bar 59 relatively to the left from the position shown in Fig. 2, as the control block is swung in a counterclockwise direction in its channel 14, an arm 61 of the bell crank lever 62 has an actuating pin 63 at the outer end thereof mounted to ride in a slotted opening 64 on an offset portion 65 of the left hand end of the actuating bar 59.

The bell crank lever 62 is pivoted at 67 on the control block and has an inwardly extending arm 68, with a cam engaging pin 69 on the inner end thereof. This cam engaging pin is mounted to ride in a cam groove or guide track 70 on the inner side of the closure plate 43 (see Fig. 1).

A control lever 71, for adjusting the position of the control block member in its annular channel 14, is keyed, as at 72, to the control shaft 41. Any conventional means may be used to operate the control lever.

The second rotor casing 11 has an inner structural arrangement similar to that described for the casing 10. The ports 17 and 18 from the casing 10 are cross connected to similar ports in the casing 11 through a two-way valve 73 in the valve chamber 12, as illustrated diagrammatically in Fig. 3. When the valve 73 is in the position illustrated in solid lines in Fig. 3, the ports of the casings 10 and 11 are connected so as to cause the rotors to operate in reverse directions from each other, as illustrated in Fig. 1. However, when the valve is turned to cause the fluid to flow between the ports so as to cross over through diagonal passages 74 and 75, the relative rotation of the rotors is reversed.

By moving the control lever 71 and a second control lever 77, connected to a control shaft 78 in the second casing 11, almost any relative speed ratios may be attained between the rotors of the two casings. Since the action of this general type of eccentric vane pump is so well known, it is believed unnecessary to enter into a detailed description of their operation.

By moving the control lever for the driving pump mechanism to a high delivery position remote from the permanent abutment 15 and moving the control lever for the other pump mechanism to a low delivery position, the effect of a relatively high gear ratio between the driving and driven elements is achieved. By reversing the settings of the levers, a reverse effect will be provided. In addition to providing effective driving control between the driving and driven elements, an effective braking control is provided through the same mechanism since the mechanical advantage ratio between the driving and driven members may be increased and decreased practically to the point of infinity.

While I have illustrated and described a preferred form of my invention, it will be apparent to those familiar with the art that various changes can be made without departing from the spirit of the invention. It is desired, therefore, not to limit the invention except as set forth in the following claims.

2,638,054

I claim:

1. In a hydraulic transmission device, a housing having a circular chamber therein, a rotor within said chamber mounted eccentrically of the chamber, said rotor and said housing defining an annular control channel around the periphery of the rotor, said housing providing a pair of circumferentially spaced openings to said channel, a stationary partition mounted between said openings substantially to abut said rotor thereby to close off said channel, a plurality of rotor blades slidably mounted radially of said rotor, rotor blade retainer means maintaining the inner ends of said rotor blades in a circular path eccentric of the axis of the rotor and concentric with the housing as the rotor revolves, a circumferentially movable control block mounted adjustably for movement in a path concentric with the housing in said channel, said block extending the width and thickness of said channel and having a basic length to span the space between the outer ends of the adjacent rotor blades at substantially their point of minimum lateral separation, said block including means mounted on said block, movable into and out of near abutting relation with the ends of said rotor blades, and control means mounted to move said last-mentioned means into and out of near blade-abutting position at predetermined zones in the path of movement of said movable control block thereby to vary the effective length of said block.

2. In a hydraulic transmission device, a housing having a circular chamber therein, a rotor within said chamber mounted eccentrically of said chamber, said rotor and said housing defining an annular control channel around the periphery of the rotor, said housing providing a pair of circumferentially spaced openings to said control channel, a stationary partition mounted between said openings substantially to abut said rotor thereby to close off said channel, a plurality of rotor blades slidably mounted radially of said rotor, rotor blade retainer means maintaining the inner ends of said rotor blades in a circular path eccentric of the axis of the rotor and concentric with the housing as the rotor revolves, a circumferentially movable control block mounted adjustably for movement in a path concentric with the housing in said channel, said block extending the width and thickness of said channel and having a basic length to span the space between the outer ends of adjacent rotor blades at their point of minimum lateral separation, an element mounted on said block and movable into and out of abutting relation with the ends of said rotor blades thereby to vary the effective length of said block, cam means mounted to move said element into and out of blade-abutting position, means operatively connected between said cam means and said housing to move said element into and out of blade-abutting position on predetermined circumferential movement of the block to locations of different blade outer end separation.

3. In a hydraulic transmission device, a housing having a circular chamber therein, a rotor within said chamber mounted eccentrically of said chamber, said rotor and said housing defining an annular control channel around the periphery of the rotor, said housing providing a pair of circumferentially spaced openings to said control channel, a stationary partition located between said openings to substantially abut said rotor, a plurality of rotor blades slidably mounted radially of said rotor, rotor blade retainer means maintaining the inner ends of said rotor blades in a circular path eccentric to the axis of said rotor and concentric with the housing as the rotor revolves, a control disk pivotally mounted within said housing and having a marginal portion defining a side of said annular control channel, a control block mounted on said marginal portion of said disk and extending across said control channel closely adjacent the path described by the ends of the rotor blades, and means on said housing for adjustably positioning said disk to adjustably position said block circumferentially of said control channel.

4. In a hydraulic transmission device, a housing having a circular chamber therein, a rotor within said chamber mounted eccentrically of said chamber, said rotor and said housing defining an annular control channel around the periphery of the rotor, said housing providing a pair of circumferentially spaced openings to said control channel, a stationary partition located between said openings, rotor blades slidably mounted radially of said rotor, rotor blade retainer means for guiding the inner ends of said blades in a circular path eccentric to the axis of said rotor as the rotor revolves, a control disk within said chamber having a marginal portion at the side of said control channel, said disk being pivotally mounted concentrically of the housing, adjustable control means for adjusting the rotatable position of said disk, a control block mounted on said marginal portion of said disk for movement therewith, said block extending across said control channel adjacent the path described by the outer ends of said blades, said block being movable lengthwise of said channel from a position adjacent the partition to a position circumferentially remote therefrom, the block having a basic length such as to span the space between the outer ends of adjacent blades at their point of minimum separation in said channel.

5. A device as set forth in claim 4 in which said block includes an element movably mounted thereon and a cam means engageable with said element to move said element into blade-abutting position, and in which there is interengaging means on said housing and said cam means for operating said cam means upon pivotal movement of said disk and the movable abutment member thereon.

6. In a hydraulic transmission device, a housing having a circular chamber therein, a rotor within said chamber mounted eccentrically of said chamber, said rotor and said housing defining an annular control channel around the periphery of the rotor, said housing providing a pair of circumferentially spaced openings to said control channel, a partition in said channel between said openings, said rotor having movable radially thereof, a control block mounted in said channel for adjustable movement lengthwise thereof, said block extending the width and thickness of said channel means for varying the effective length of said block during adjusted movement, and means projecting exteriorly of the housing for adjustably positioning said block circumferentially of the housing, said last-mentioned means including a control disk mounted within said housing pivoted concentrically thereof and carrying said abutment.

7. In hydraulic transmission means, a housing, a rotor mounted in said housing eccentrically thereof, said rotor having blades movable radially of the axis of the rotor, said housing and said rotor defining an annular channel around the periphery of said rotor, said housing providing a pair of circumferentially spaced openings to said channel, a partition mounted in said housing and positioned in said channel between said openings, a control block mounted in said channel for adjustable movement lengthwise thereof, said block extending the width and thickness of said channel, means for varying the effective length of said block during adjusted movement thereof, said means comprising plates on said block disposed radially of the rotor and mounted for edgewise movement into and out of near-abutting relation with the ends of the blades of the rotor, cam means for moving said plates edgewise successively, said housing having a guide track eccentric to said rotor and rotor housing, and linkage means operatively connecting said cam means and said guide track, said linkage means including an element engageable with said guide track.

8. In a hydraulic transmission device, a housing having a circular chamber therein, a rotor within said chamber mounted eccentrically of said chamber, said rotor and said housing defining an annular control channel around the periphery of the rotor, said housing providing a pair of circumferentially spaced openings to said control channel, a partition in said channel between said openings, said rotor having blades movable radially thereof, a control block mounted in said channel for adjustable movement lengthwise thereof, means for varying the effective length of said block during adjusted movement thereof, said means comprising a plate on said block mounted for edgewise movement toward and away from said rotor, and means effecting movement of said plate upon movement of said block.

VERNON O. HARTZ.

References Cited in the file of this patent

UNITED STATES PATENTS

| Number | Name | Date |
|---|---|---|
| 466,662 | Duncan | Jan. 5, 1892 |
| 1,482,807 | Newberg | Feb. 5, 1924 |
| 1,616,285 | Stern | Feb. 1, 1927 |
| 1,720,577 | Stern | July 9, 1929 |
| 2,313,246 | Kendrick et al. | Mar. 9, 1943 |
| 2,426,491 | Dillon | Aug. 26, 1947 |

FOREIGN PATENTS

| Number | Country | Date |
|---|---|---|
| 24,330 | France (Addition to 525,684) | Feb. 14, 1922 |
| 192,903 | Great Britain | Feb. 15, 1923 |
| 323,910 | Great Britain | Jan. 16, 1930 |
| 415,472 | Germany | June 20, 1925 |